July 6, 1926.
W. E. TRENT
1,591,729
PROCESS OF RECOVERING BY-PRODUCTS FROM COALS
Filed March 18, 1922
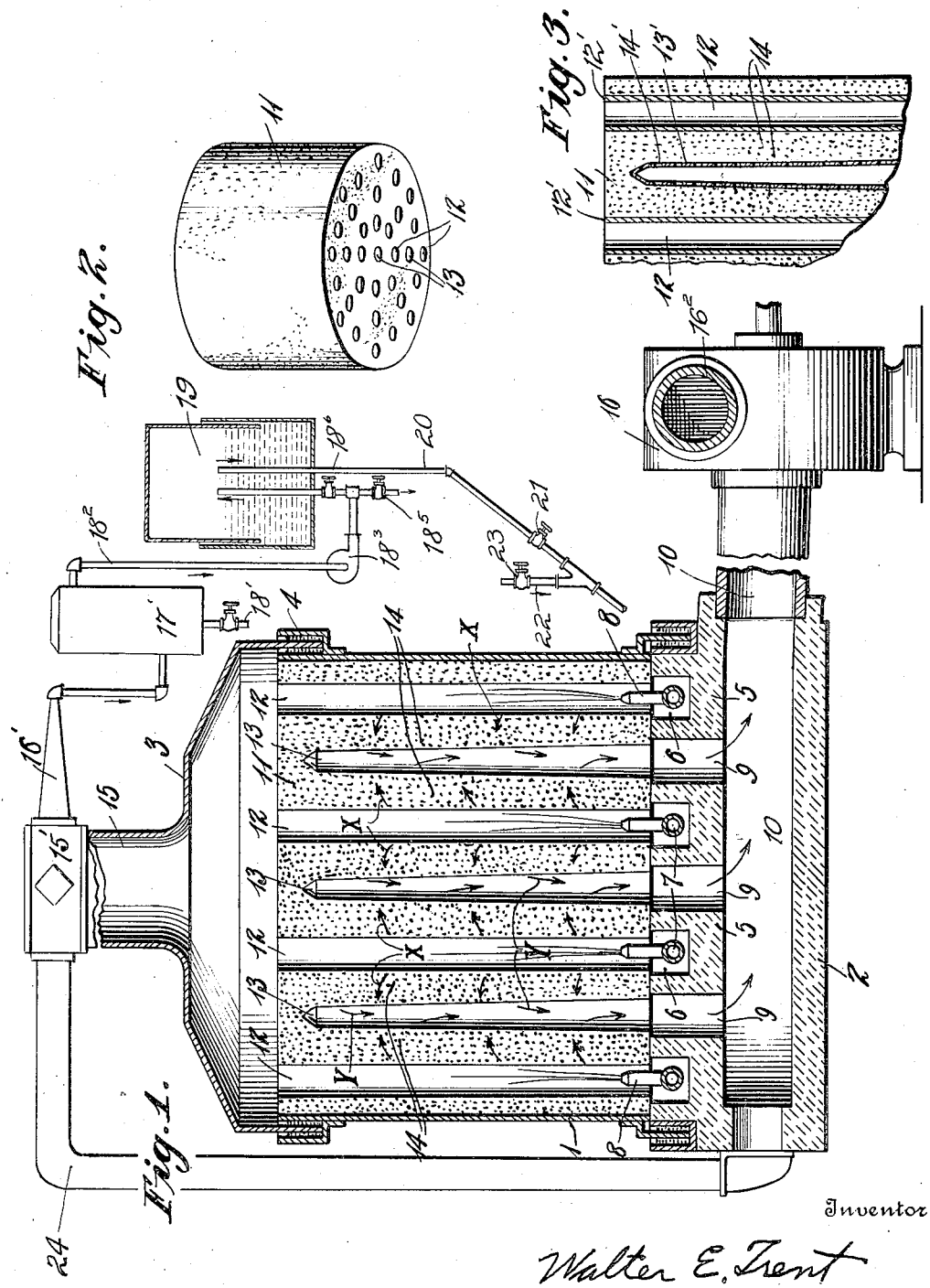
Inventor
Walter E. Trent
By Charles M. Thomas
Attorney Patented July 6, 1926.

1,591,729

UNITED STATES PATENT OFFICE.

WALTER E. TRENT, OF WASHINGTON, DISTRICT OF COLUMBIA, ASSIGNOR TO TRENT PROCESS CORPORATION, OF WASHINGTON, DISTRICT OF COLUMBIA, A CORPORATION OF DELAWARE.

PROCESS OF RECOVERING BY-PRODUCTS FROM COALS.

Application filed March 18, 1922. Serial No. 544,906.

The invention relates to the art of by-product distillation.

It is an object of the invention to remove by-products from carbonaceous materials such as comminuted coals, by passing heating gases through a series of formed flues extending through a mass of the coal, whereby the heat vaporizes volatile constituents, which constituents are discharged as vapors and gases through a series of independent non-communicating vapor discharge passageways formed in the mass. The vapors passing from the passageways are collected and are not diluted with the heating gases, while the residue may be either a carbonized product or a fused product containing certain volatile constituents.

With the foregoing conception in mind, the invention preferably consists in forming in a mass of comminuted coal, or the like, a plurality of flues extending therethrough, and through which heating gases pass so that the applied heat penetrates the carbonaceous material and vaporizes all or part of the volatiles contained therein. In the mass I also form a second series of vapor and gas discharge passageways located between heating flues, but entirely out of free communication with said flues whereby the vaporized volatiles driven out of the mass by the penetrating heat enter said discharge passageways and pass thereto for delivery to a receiver. The gas discharge flues are preferably closed at one end so as to be out of free communication with the heating flues and at the other end they connect with a common gas discharge outlet. The heating gases introduced to the flues may come in direct contact with the walls thereof, or said gases may be passed through metallic or refractory liners inserted in the flues so as to apply an indirect heat to the mass and thereby positively prevent, when necessary, any and all possible commingling of the heating gases with the gas and vapor products. In either instance the volatiles will be rapidly vaporized and gasified and said volatiles thus driven out of the mass enter the gas discharge passageways out of communication with the heating flues.

The plurality of heating flues with the adjacent gas flues permit applying the heat more or less uniformly to the entire charge at the same time, which causes a very rapid carbonization of the mass and permits the easy and rapid escape of the resulting gases under conditions that prevent the mixing of the heating gases with the product gases which results in gases of a high heat and light value. In order to facilitate the removal of the vapors and gases, vacuum or suction is applied to the gas discharge passageways. This suction, beside making rapid removal of the vapors, prevents the volatile products from discharging back into the heating flues.

Heat may be applied to the heating flues by burning combustible gases in them with air and then after the temperature has been raised air may be admitted which will cause the burning of part of the carbon surrounding the holes, thus generating the heat to finish the operation.

During the heating up period of a fresh charge, by burning combustible gases some of the volatile of the charge will escape with the heating gases and these may be removed by scrubbing before these gases are discharged or dispensed with. When the charge becomes sufficiently hot the heating gases, on account of the presence of the heated carbon, will leave the generator as combustible gases as the $CO_2$ will, to a large extent, be reduced and form CO and when this gas becomes sufficiently combustible, by reason of the charge having a temperature that will cause the reaction, these gases will be saved and brought back to carry on the heating operation, at least, during the first part of the treatment.

When it is desirable to increase the heating value of the combustible gases, formed in the heating flues, steam may be introduced with the air in controlled quantities and by its decomposition form a certain amount of blue water gas.

It is a further object of the invention to provide, when desirable, a mixing of gases from the heating flues with the vapors and gases discharging from the discharge flues. This is for the purpose of making an enriched water gas which is done in the following manner: heat is applied to the heating flues by burning combustible gases or by burning part of the charge with air. When the carbon surrounding the heating flues becomes incandescent, steam is admitted to the heating flues which decomposes, forming hydrogen and carbon monoxide gas or ordinary blue water gas. This gas is by-passed from the ordinary outlet so that it is introduced to and commingles with the vapors and gases from the discharge outlets. The blue water gas, having a very high temperature, causes a cracking of discharge vapors into fixed gases thereby making a rich gaseous mixture. The condensable products can be removed from this gas in the usual manner and the resulting gas is similar in all respects to the ordinary carbureted water gas from standard water gas sets.

In the preferred embodiment of my invention the gases passing through the flues are of sufficient temperatures to vaporize substantially all of the volatile constituents that pass out through the non-communicating gas passageways leaving a product consisting principally of coke. In a modified embodiment of my invention, however, the temperature of the gases passing through the flues, may be so controlled that, instead of vaporizing substantially all of the volatiles and leaving a coke residue, only a portion of the volatiles are vaporized and the carbonaceous mass fused together with a substantial quantity of volatile substances. Such a process is practiced when it is desired to form a residue consisting of a fused product containing a substantial quantity of volatile substances which residue forms, for some purposes, a desirable fuel.

In the accompanying drawings I have shown a single embodiment of this invention, but it will be understood that such a showing is merely made for the purpose of illustration and may be radically changed without departing from the spirit of the invention.

In the drawings, Figure 1 represents a vertical sectional view of a retort having a charge therein;

Figure 2 is a perspective view of a charge on a reduced scale; and,

Figure 3 discloses a vertical sectional view of a charge having interposed liners in the heating flues.

Referring now more particularly to the drawings wherein like reference characters indicate corresponding parts, the numeral 1 designates a retort which is seated on a base 2 and is provided with a removable cover or closure 3 united to the retort by a water seal 4. The upper part of the base 2, designated by the character 5 of the retort 1, is provided with channels 6 extending therein and adapted to receive gas pipes 7 provided with burner nozzles 8 projecting into the heating flues 12. Passages 9 extend through the upper part of the base 5 and communicate with the volatile discharge flues 13 to be later described.

In accordance with my invention I take a mass of comminuted coal, shale, or other carbonaceous bearing material and form the mass into a charge 11, as shown in Figure 2. This charge is formed by placing the mass in a container or the like, and molding therein the heating flues 12 extending entirely therethrough, and the gas discharge passageways 13, which are closed at their upper ends, but open at the lower ends thereof and in registry with the passages 9. The comminuted material that is to be molded in a charge with preformed passageways 12 and 13 therein is preferably mixed with a binder such as hydrocarbon oil so that the charge will retain its shape when placed within a retort. Removable mandrels may be employed for forming the flues 12 and passageways 13 in the charge, or the said charge may be formed with the passageways in any other satisfactory manner.

It will be noted, however, that the passageways 12 and 13 are out of communication, and that a gas discharge passageway 13 is disposed between a pair of heating flues 12. The heating flues 12 may have inserted therein thin metallic, or refractory, liners 12' extending throughout the length thereof and in contact with the walls of the charge when it is desired to completely prevent direct contact of the heating gases issuing from the burners 8 with any of the carbonaceous products, and when the charge is without binder and will not permit the molding of holes that will stay open during the treatment. Likewise, when the charge is too loose to permit of molding discharge openings 13 perforated pipes or hollow molds 13' with perforations 14' are used in the discharge passages as shown in Figure 3, and then the discharged vapors and gases find their way into their outlets through the perforations. However, for most purposes the use of the liners will not be needed and the heat will be applied directly to the walls of the material.

When the by-products are to be removed from a charge, as shown in Figure 2, the charge is inserted in the retort 1, and gaseous products of combustion issuing from the burners 8 pass through the flues 12. The gases transmit their heat directly to the walls of the flues 12, or pass through thin liners 12' when used. The heat of these gases rapidly penetrates the relatively small area of material 14 disposed between adjacent heating flues 12 and gas discharge passageways 13, causing a very rapid vaporization of all or part of the volatiles contained in the small area of material between adjacent heating flues 12 and gas discharge passageways 13. The heat drives the volatiles in the direction indicated by arrow X from the material directly into the passageways 13 where said vapors and gases pass in the direction of the arrows Y down through said passageways through the openings 9 and out through the gas discharge flue 10 to a point of collection, while the heating gases discharge through the flues 12 and discharge to stack 15 and through the two-way discharge valve 15' passing through pipe 16' to condensing apparatus 17' where the condensable contents of the gases are condensed and discharge through valve 18'. The fixed gases pass through the pipe 18² to the suction pump 18³ and then from this pump the gases low in B. t. u. are discharged through valve 18⁵ and the combustible gases are discharged through valve 18⁶ into the gas holder 19. The combustible gas, from the gas holder, finds an outlet through pipe 20, controlled by valve 21, connecting to the burner pipes 7 and an air inlet 22. The air inlet is controlled by a valve 23 connected with the pipe 20 for admitting the proper amount of air to burn the gases or to admit the air when air alone is sufficient to cause ignition of previously heated charge.

The general operation results in a most rapid by-product distillation of the coal, and in view of the fact that the flues 12 are out of direct communication with the passageways 13, the distilled products do not intermingle with the heating products of combustion, which intermingling would cause a dilution of the vaporized volatiles. Such a dilution is not desirable where high grade gases must be obtained.

A suction pump 16 communicates with the gas discharge 10 and when the process is being practiced this pump is in operation, creating a suction in the gas passageways 13, which tends to accelerate the vaporization of the volatiles in the carbonaceous material, and also causes a most rapid discharge of the gases entering the gas passageways 13. The discharge pipe 16² of the suction pump 16 delivers the gas and vapors to condensing and scrubbing apparatus of the conventional type and the gas is then sent to a gas holder, not shown, for distribution or use. When water gas is being manufactured and the suction fan 16 is drawing a mixture of blue water gas with the distilled vapors and gases, the products are discharged through the pipe 16² into a superheater of the conventional type from which the gases go to a condenser and scrubber and thence to a gas holder. When water gas is being made the two-way valve 15' is closed against the normal discharge pipe 16' and the gases are discharged through pipe 24 and into chamber 10 of the base 2. It will be understood that after the mass has been brought to an incandescent condition by the passage of air through the line 22, this supply of air is then discontinued and steam admitted through this same line. It will furthermore be appreciated that when water gas is being made the briquette contains no liners as shown in the modified disclosure in Figure 3. When the water gas is not being made the two-way valve is closed against the discharge pipe 24 and opens to a discharge pipe 16'.

From the foregoing, it will be seen that two types of gases may be simultaneously generated in this system. One type in the flues 12, which when burned in the tubes forms the necessary heat to generate the second type of gas which has outlets through the passageways 13. The first is after the order of a producer gas of low heating value and the second is after the order of either a carbureted water gas or coal retort gas, high in B. t. u. and candle power value, containing condensable oils which are to be recovered before the gas is consumed.

The material is treated in the foregoing manner by the heating gases controlled in a regulated temperature so that substantially all of the volatiles may be driven out of a charge, leaving a residue consisting principally of coke, or the temperature of the heating gases and the time of the treatment may be controlled so that only a portion of the volatiles are vaporized and driven from the mass, while the carbonaceous particles are fused together, containing a substantial quantity of volatile substances. The gas discharge passageways 13 are arranged so as to discharge downwardly which will cause a natural drainage of any liquid products that may be driven from the carbonaceous mass.

The present invention relates to a process by which by-products or volatiles may be readily removed from comminuted carbonaceous material, as well as a process for rapidly producing two grades of gases simultaneously. In other words, a gas of the producer type may be made by the burning of the fuel surrounding the flues, which gas is collected in the receiver 19 and the heat generated by such combustion of the fuel drives volatiles into the passageways 13, which volatiles and any contained condenser products constitute high grade coal gas passing to any scrubber or receiver and undiluted with the gases of combustion passing through the flues 12.

Having thus described my invention what I claim is:

1. A process for recovering volatiles from comminuted carbonaceous material, consisting in forming the comminuted carbonaceous material into a briquet having a series of formed passageways therein, in passing heating gases through certain of said passageways, to vaporize volatiles contained in the carbonaceous material, and in discharging the volatiles from other passageways out of communication with the passageways receiving such heating gases.

2. A process for removing volatile constituents from comminuted coal, consisting in forming a briquet of comminuted coal with a plurality of heating flues and a series of adjacent discharged passageways out of open communication with the heating flues, in applying heat to the walls of the flues to vaporize volatile substances contained in the comminuted coal, and in discharging such vaporized constituents from the briquet through the discharge passageways, without permitting such constituents to substantially commingle with the heating gases.

3. A process for removing volatiles from briquets of comminuted carbonaceous material having a series of heating flues and a series of discharge passageways formed therein, comprising applying heat to the walls of the heating flues in said briquet to vaporize the volatiles contained therein, and in discharging such volatiles from the briquet through said passageways out of open communication with the heating flues.

4. A process for removing volatiles from comminuted carbonaceous material, consisting in mixing the comminuted carbonaceous material with a binder, in forming a briquet from said material having a plurality of flues and gas discharging passageways therein, in applying heat to the walls of said flues to vaporize volatiles contained in the carbonaceous material, and in discharging such volatiles through said gas discharge passageways formed in said briquet.

5. A process for recovering volatiles from briquets of comminuted carbonaceous material having a series of formed heating flues and gas discharging passageways, consisting in applying heating gases to the walls of said flues to vaporize volatiles contained in the carbonaceous material, and in discharging said volatiles through said passageways without permitting the same to intermingle with the heating gases.

6. A process for recovering volatiles from a briquet of comminuted carbonaceous material having separately formed flues and passageways therein, comprising heating the walls of the flues sufficient to ignite a portion of the fuel mass thereof to generate heat to vaporize volatiles in the briquet, and in discharging such volatiles through said formed passageways without permitting intermingling thereof with heating gases in said flues.

7. A process for recovering products from briquets of comminuted carbonaceous material having a series of separately formed flues and passageways therein, consisting in heating the walls of said flues by the application of heating gases thereto in indirect heat conductive contact with such walls to vaporize volatiles in the briquet, and in discharging such volatiles through said passageways without commingling with the heating gases in said heating flues.

In testimony whereof I affix my signature.

WALTER E. TRENT.